United States Patent
Lappalainen

(10) Patent No.: US 8,045,542 B2
(45) Date of Patent: Oct. 25, 2011

(54) TRAFFIC GENERATION DURING INACTIVE USER PLANE

(75) Inventor: Kristian Lappalainen, Oulu (FI)

(73) Assignee: Nokia Corporation, Espoo (FI)

( * ) Notice: Subject to any disclaimer, the term of this patent is extended or adjusted under 35 U.S.C. 154(b) by 1196 days.

(21) Appl. No.: 11/335,053

(22) Filed: Jan. 18, 2006

(65) Prior Publication Data
US 2007/0097958 A1    May 3, 2007

(30) Foreign Application Priority Data
Nov. 2, 2005  (EP) .................................... 05023869

(51) Int. Cl.
*H04L 12/66* (2006.01)
(52) U.S. Cl. ........ 370/352; 370/231; 370/235; 370/329; 370/445; 370/437; 455/445; 455/450
(58) Field of Classification Search .............. 370/352, 370/503, 331, 509, 248, 349, 389, 310.2, 370/328, 338, 437, 235, 231; 348/473; 709/224; 455/452.2, 454, 422, 450, 455, 445
See application file for complete search history.

(56) References Cited

U.S. PATENT DOCUMENTS

| | | | | |
|---|---|---|---|---|
| 5,339,314 | A * | 8/1994 | Tanaka et al. ................. | 370/230 |
| 6,212,175 | B1 * | 4/2001 | Harsch .......................... | 370/338 |
| 6,914,637 | B1 * | 7/2005 | Wolf et al. .................... | 348/473 |
| 6,928,289 | B1 * | 8/2005 | Cho et al. ..................... | 455/452.2 |
| 7,352,705 | B1 * | 4/2008 | Adhikari et al. .............. | 370/248 |
| 7,760,686 | B2 * | 7/2010 | Saito et al. .................... | 370/329 |
| 2001/0040925 | A1 * | 11/2001 | Abelard et al. ........... | 375/240.26 |
| 2003/0086407 | A1 | 5/2003 | Bhatt et al. | |
| 2005/0002400 | A1 | 1/2005 | Karol et al. | |
| 2005/0043035 | A1 * | 2/2005 | Diesen et al. ................. | 455/454 |
| 2005/0141541 | A1 * | 6/2005 | Cuny et al. .................... | 370/437 |
| 2005/0265373 | A1 * | 12/2005 | Khan ............................. | 370/437 |

(Continued)

FOREIGN PATENT DOCUMENTS
JP    2005-218000    11/2005

(Continued)

OTHER PUBLICATIONS
English translation of Office action for Japanese Application No. 2008-537224 dated Oct. 12, 2010.

(Continued)

*Primary Examiner* — Charles Appiah
*Assistant Examiner* — Michael Vu
(74) *Attorney, Agent, or Firm* — AlbertDhand LLP

(57) ABSTRACT

The present invention relates to a method, transmitting device (10) and system for providing user plane traffic during a state of inactive user plane of a connection to an access network. A sequence of successive packet headers, adapted to continue a header sequence transmitted until the start of the state of inactive user plane is generated, and respective dummy portions are added to the sequence of successive packet headers. The generated stream of data packets is then transmitted from the transmitting device (10) via the unlicensed mobile access network during the state of inactive user plane so as to obtain a continuous stream of user data irrespective of the state of inactive user plane. Thereby, user plane traffic can also be provided during states of inactive user plane of the transmitting device (10), e.g. holding states, call setup states or mute states, and real-time traffic requirements can be met.

27 Claims, 1 Drawing Sheet

U.S. PATENT DOCUMENTS

| | | | | |
|---|---|---|---|---|
| 2005/0276282 A1* | 12/2005 | Wells et al. | .................... | 370/503 |
| 2006/0020449 A1* | 1/2006 | Wong et al. | .................... | 704/215 |
| 2006/0155843 A1* | 7/2006 | Glass et al. | .................... | 709/224 |
| 2006/0245368 A1* | 11/2006 | Ladden et al. | ................. | 370/248 |
| 2006/0256751 A1* | 11/2006 | Jagadeesan et al. | ........... | 370/331 |

FOREIGN PATENT DOCUMENTS

| | | |
|---|---|---|
| WO | WO 97/37504 | 10/1997 |
| WO | WO 00/60785 | 10/2000 |
| WO | WO 01/08136 | 2/2001 |

OTHER PUBLICATIONS

English translation of Office action for Chinese Application No. 200680040982.0 dated Nov. 17, 2010.

Office Action for New Indonesia National Phase Entry of Patent Application No: WO0200801320, dated Jul. 6, 2011.

English translation of Office Action for New Indonesia National Phase Entry of Patent Application No. WO0200801320, dated Jul. 6, 2011.

* cited by examiner

TRAFFIC GENERATION DURING INACTIVE USER PLANE

CROSS-REFERENCE TO RELATED PATENT APPLICATIONS

The present application claims priority to European Patent Office Priority Application 05 023 869.0, filed Nov. 2, 2005, the specification, drawings, claims and abstract of which is incorporated herein by reference in its entirety.

FIELD OF THE INVENTION

The present invention relates to a method, transmitting device, terminal device, network controller device and system for providing user plane traffic through an access network, such as an unlicensed mobile access (UMA) network.

BACKGROUND OF THE INVENTION

UMA technology enables alternative access to cellular mobile services, e.g. GSM (Global System for Mobile communication), WCDMA (Wideband Code Division Multiple Access) or GPRS (General Packet Radio Services) over an unlicensed spectrum, including WLAN (Wireless Local Area Network), Bluetooth™ and WiFi™. The UMA technology enables seamless delivery of mobile voice and data services over unlicensed wireless networks. The same mobile identity is provided on cellular radio access networks and unlicensed wireless networks, so that seamless transitions (e.g. roaming and handover) between these networks is possible.

In particular, UMA provides an extension of GSM/GPRS mobile services into the customer's premises that is achieved by tunneling certain GSM/GPRS protocols between the customer's premises and the core network over a broadband IP (Internet Protocol) network, and relaying them through an unlicensed radio link inside the customer's premises. UMA is a complement to traditional GSM/GPRS radio coverage, used to enhance customer premises coverage, increase network capacity and potentially lower costs. UMA constitutes a part of the radio access network and is introduced by adding a UMA Network Controller (UNC) as a link between the WLAN and the GSM core network using standard A and Gb interfaces. Hence, from the GSM core network's perspective, the UNC is perceived as just another Base Station Controller (BSC). The UNC functionality could also be introduced into existing BSC infrastructure, thus offloading the core network from signaling and multiple resource handling related to users shifting between WLAN and GERAN (GSM/EDGE Radio Access Network) in the same area.

In UMA, it is possible to put a call on hold, like in normal circuit-switched (CS) call. Real-time traffic, such as audio or video, of the CS domain user plane is received at the UNC via the Up interface and conforms to the RTP (Real Time Protocol) framing format defined in the IETF (Internet Engineering Task Force) specifications RFC 3267 and RFC 3551. RTP provides end-to-end network transport functions suitable for applications transmitting real-time data over multicast or unicast network services. The data transport is augmented by the Real Time Control Protocol (RTCP) to allow monitoring of data delivery in a manner scalable to large multicast networks and to provide minimal control and identification functionality. RTP and RTCP are designed to be independent of the underlying transport and network layers. An RTP packet consists of a fixed RTP header, a possibly empty list of contributing sources, and payload data. The RTP payload comprises the data transported by RTP in the RTP packet, for example, audio samples or compressed video data. The source of a stream of RTP packets is identified by a 32-bit numeric synchronization source (SSRC) identifier carried in the RTP header so as not to be dependent upon the network address. Additionally, a source of the stream of RTP packets that has contributed to the combined stream produced by an RTP mixer can be identified in a contributing source (CSRC) list. Such a list can be used, for example, in audio conferencing to identify all participants whose speech was combined to produce an outgoing packet, allowing the receiver to indicate the current talker, even though all audio packets contain the same SSRC identifier.

Additionally, the RTP header includes a payload type (PT) field of 7 bits, which identifies the format of the RTP payload and determines its interpretation by the application, a sequence number (SN) field of 16 bits, which is incremented by one for each RTP data packet sent and which may be used by the receiver to detect packet loss and to restore the original packet sequence, and a time stamp (TS) of 32 bits, which reflects the sampling instant of the first octet in the RTP packet. The sampling instant can be derived from a clock that increments monotonically and linearly in time to allow synchronization and jitter calculations.

However, UMA Protocols (Stage 3) R1.0.4 require that a mobile terminal or user equipment (UE) sends RTP packets at least every 480 ms. During a holding state (call-on-hold) of the UE the audio encoding is stopped. Thus, there is no input to the RTP protocol to send to the network. Also, the UMA protocols do not describe at all how the call-on-hold situation should be handled in RTP packet point of view. In this regard, the UMA Protocols require that all RTP data traffic during one UMA call (including a call-on-hold situations) relates to the same RTP stream. This means RTP headers' SSRC and PT fields are identical, the TS field is incremented according to the payload decoding (will not be incremented if there is no payload) and the SN field is incremented in each packet.

SUMMARY OF THE INVENTION

It is therefore an object of the present invention to provide a method, transmitting device and system for enabling a holding state of a transmitting device connected via an unlicensed mobile access network.

This object is achieved by a method of providing user plane traffic during a state of inactive user plane of a connection to an access network, said method comprising the steps of:
  generating a sequence of successive packet headers, adapted to continue a header sequence transmitted until the start of said state of inactive user plane;
  adding to said generated header sequences respective dummy portions; and
  transmitting said stream of data packets via said access network during said state of inactive user plane so as to obtain a stream of user data irrespective of said state of inactive user plane.

Furthermore, the above object is achieved by a transmitting device for providing user plane traffic during a state of inactive user plane of a connection to an access network, said transmitting device comprising:
  header generating means for generating a sequence of successive packet headers, adapted to continue the header sequence transmitted until the start of said state of inactive user plane;
  dummy portion generating means for generating dummy portions of data packets; and packet assembling means for adding said generated dummy portions to said generated sequence of successive packet headers, so as to obtain a stream of data packets; and transmitting means for transmitting said stream of data packets during said state of inactive user plane so as to obtain a continuous stream of user data irrespective of said state of inactive user plane.

Accordingly, the call-on-hold problem, or any other problem associated with a state of an inactive user plane (where no user traffic is available) can be solved by transmitting a stream of data packets with packet headers adapted to seamlessly match with the header sequence transmitted until the start of the state of inactive user plane, e.g. holding state. The data packets are generated by adding respective dummy portions to the packet headers. The generated stream of data packets provides continuous user plane traffic during the state of inactive user plane, so that the RTP requirements can be met.

According to a first aspect of the present invention, the dummy portions are generated with an information indicating that no data is carried in a payload portion of the data packets. As a specific example, the information could be a NO_DATA field of an adaptive multi-rate (AMR) speech coder.

According to a second aspect of the present invention, the dummy portions could be generated to include no payload. Then, a time stamp information of the generated successive packet headers could be set or selected to be identical to a time stamp information of the last packet which included payload and which was transmitted before the start of the holding state.

According to a third aspect of the present invention, the dummy portions could be generated to comprise a silence descriptor information. Here, a transmission interval between packets of the stream of data packets could be set or selected during the holding state based on the length of a comfort noise defined by the silence descriptor information.

Finally, according to fourth aspect of the present invention, the dummy portion could be copied from packets received at the transmitting device during the state of inactive user plane, so that received packets are looped back with modified headers.

In all above first to fourth aspects, packet transmission during the state of inactive user plane may be performed at a predetermined interval. Furthermore, a sequence number of the generated successive packet headers may be incremented with each successive packet header. The stream of data packets may be generated in accordance with a real time protocol.

The transmission device may be comprised in a terminal device, e.g. a mobile phone or user equipment, or in a network controller device.

The state of inactive user plane may be at least one of a holding state and a mute state.

Further advantageous modifications are defined in the dependent claims.

BRIEF DESCRIPTION OF THE DRAWINGS

The present invention will now be described based on a preferred embodiment with reference to the accompanying drawings in which.

DETAILED DESCRIPTION OF THE PREFERRED EMBODIMENTS

In the following, the preferred embodiment will be described in connection with a terminal device connected via an UMA network to a GSM- or GPRS-based network.

Figure 1:
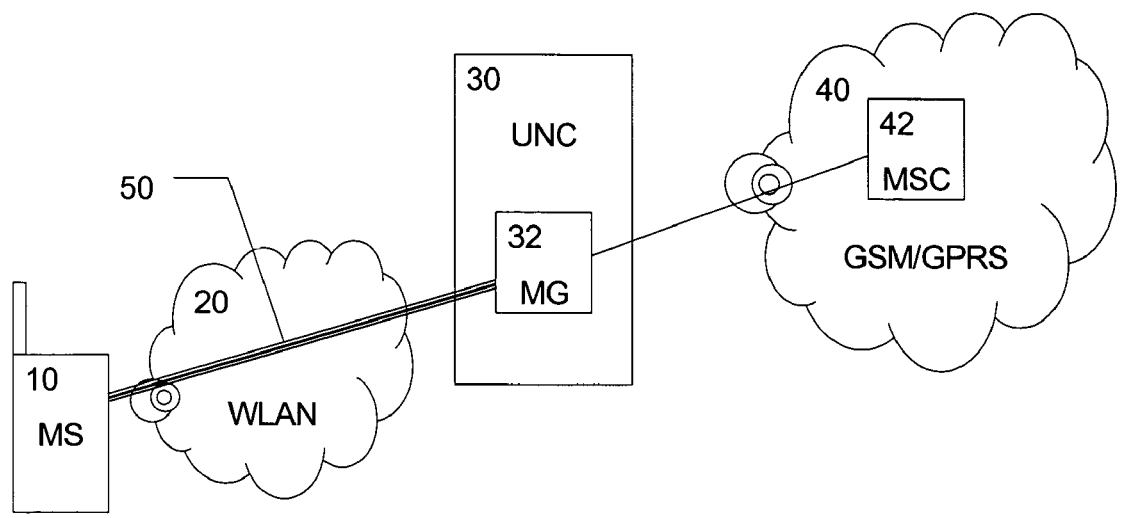
FIG. 1 shows a schematic diagram of an UMA network architecture in which the preferred embodiments can be implemented.

FIG. 1 shows a schematic UMA network architecture, wherein the UMA network consists of one or more access points (not shown) of a WLAN 20 or any other IP-based network, through which a UE or mobile station (MS) 10 can be connected via an UMA tunnel 50 to a media gateway (MG) functionality 32 of a UMA network controller (UNC) 30. From there, the data traffic is routed to a mobile switching center (MSC) of the GSM/GPRS network 40.

The access points of the WLAN 20 provide a radio link to the MS 10 using an unlicensed spectrum. The UNC 30 appears to the core network, i.e. GSM/GPRS network 40, as a GERAN base station subsystem (BSS). It includes a security gateway that terminates the secure remote access tunnel 50 from the MS 10, providing mutual authentication, encryption and data integrity for signaling, voice and data traffic. The WLAN 20 provides connectivity between the access point and the UNC 30. The UMA tunnel 50 functions as an IP transport connection which extends all the way from the UNC 30 to the MS 10, through the access point. In this architecture, the principle elements of transaction control (e.g., call processing) and user services are provided by network elements of the GSM/GPRS core network 40, namely the MSC 42 or corresponding GPRS network elements, such as a Serving GPRS Support Node (SGSN) or a Gateway GPRS Support Node (GGSN).

In the following, four alternative solutions for providing user plane traffic during a holding state (call-on-hold) of the MS 10 are described based on respective first to fourth embodiments. The solutions are based on the concept of generating a virtual user plane traffic by adding respective dummy or faked packet portions to a sequence of matched packet headers which are configured to continue a real packet stream generated before and until the start of the call-on-hold state, so that a seamless or continuous stream of RTP packets is obtained even throughout the duration of the call-on-hold state of the MS 10.

According to the first embodiment, the MS 10 is configured to send at some interval (e.g. 480 ms) during the call-on-hold state, RTP packets that contain an AMR NO_DATA field or another information indicating that the packet does not include any speech or other real-time data as the payload. In order to be compliant, this means that the RTP SN has to increase accordingly.

According to the second embodiment, the MS 10 is configured to send during the call-on-hold state, RTP packets that contain no payload and which TS fields are identical to those which were used by the last RTP packet containing real payload during the call. The value of the SN field should increment accordingly in order to allow improved function of third party RTP traffic monitors. Otherwise the RTP traffic monitors would consider the RTP packets as duplicates. The receiver of such an RTP packet will ignore it for several reason. First, the RTP packet contains no payload, and second, the value of the TS field is a duplicate from the last received correct RTP packet.

The second embodiment provides the advantage that the frequency of the RTP packets can be optimized to an interval which fulfills best the 480 ms rule of the UMA specification. Moreover, the overall packet size is the smallest. Due to the possibility of optimizing the time interval between successive packets to be as long as possible, power savings can be maximized. The MS 10 can implement power saving by stopping its encoder function during the call-on-hold state, so that no real source for is provided for silence descriptor (SID) frames.

According to the third embodiment, the MS 10 is configured to send during the call-on-hold state, RTP packets that contain an AMR SID as their payload. In order to be compliant this means that the RTP SN and TS have to be increased accordingly.

According to the fourth embodiment, the MS 10 is configured to "loop back" the received RTP packets during the call-on-hold state. Here, the MS 10 needs to modify the RTP headers from the looped back RTP packets so that they belong to the same RTP stream transmitted until the start of the call-on-hold state. This solution requires that the UNC 30 sends the packets at least at the required 480 ms interval.

Figure 2:
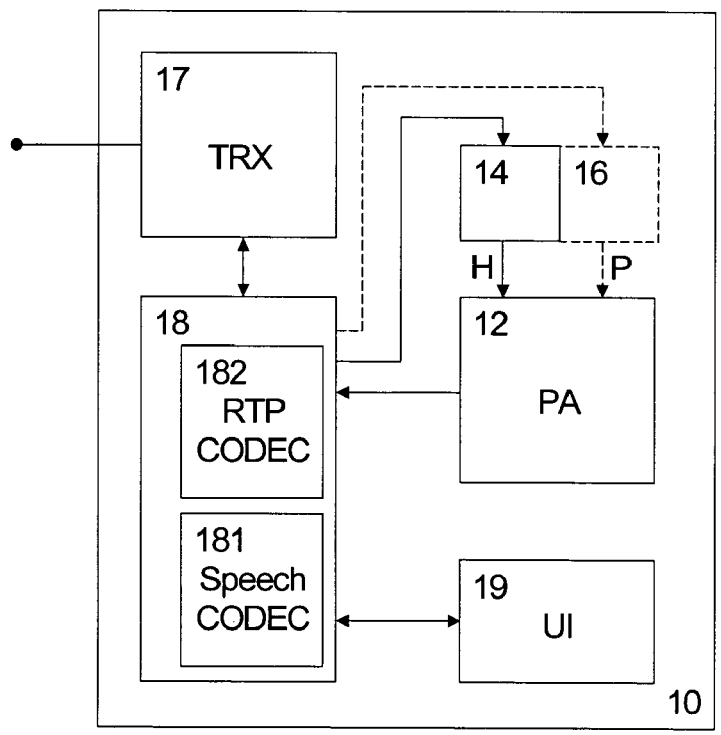
FIG. 2 shows a schematic block diagram of a transmitting device according to the preferred embodiments.

FIG. 2 shows a schematic block diagram of a transmitting device, which may be comprised in or which may correspond to the MS 10 with enhanced call-on-hold functionality according to the above first to fourth preferred embodiments.

It is noted that FIG. 2 only shows those functionalities which are required for explaining the preferred embodiments. Other functional blocks have been omitted to keep the description short and simple.

According to FIG. 2, the MS 10 comprises a transceiver unit (TRX) 17 for transmitting and receiving data packets via an air interface to an access point of the WLAN 50. The transmitted RTP packets are generated at a baseband processing circuit 18 including a speech codec function or unit 181, such as an AMR codec, and an RTP codec function or unit 182, which receives coded user data from the speech codec unit 181 and generates RTP packets comprising the coded user data in their payload portion. Input and/or output of RTP payload data, e.g. speech, voice or other real-time data, is achieved by means of a user interface (UI) 19 which may comprise a display, speaker(s), a microphone etc.

Furthermore, during a call-on-hold state, an additional packet assembling function or unit 12 is activated, which generates user plane traffic by combining or adding a sequence of packet headers H generated at a header generation function or unit 14 and respective dummy portions P generated at a dummy portion generating function or unit 16. The (virtual) RTP packets obtained at the output of the packet assembling unit 12 during the call-on-hold state are supplied to the baseband processing unit 18 where they are processed to obtain a continuous user plane traffic supplied to the TRX 17 for uplink transmission through the UMA tunnel 50. Thereby, user plane traffic can be provided even if the encoder functionality of the codec 181 is deactivated during the call-on-hold state.

In all first to fourth embodiments, the header generating unit 14 serves to generate a sequence of RTP headers, which continues the header sequence of (real) RTP packets transmitted until the start of the call-on-hold state. To achieve this, at least the RTP SN field can be incremented with each successive packet, starting from the last packet with real payload transmitted before the start of the call-on-hold state. In general, it is sufficient to generate a header sequence which will be interpreted by the UMA network as RTP data traffic which relates to the same RTP stream transmitted before the start of the call-on-hold state. The required information about the last RTP packet (with real payload) transmitted before the start of the call-on-hold state can be supplied to the header generating unit 14 by the baseband processing unit 18.

The dummy portion generating unit 16 has been drawn with dotted lines in FIG. 2, since this is an optional unit at least for the second preferred embodiment where no payload is added to the sequence of packet headers.

In the first preferred embodiment, The dummy portion generating unit 16 is adapted to supply an AMR NO_DATA field to the packet assembling unit 12, while the header generating unit 14 generates a header sequence with an RTP SN incremented with every following header.

In the second preferred embodiment, the dummy portion generating unit may be dispensed with, while the header generating unit 14 or the packet assembling unit 12 incorporate the required dummy portion or dummy information (e.g. PT field etc.) to indicate that the RTP packet contains no payload. In general the term "dummy portion" is to be understood throughout this specification in a sense that it does not relate to real traffic generated by the user or based on the user behavior, but merely serves to generate user traffic during the call-on-hold state.

In the third preferred embodiment, the dummy portion generating unit 16 is adapted to supply AMR SID field(s) to the packet assembling unit 12, while the header generating unit 14 generates a header sequence with RTP SN and TS fields incremented with every following header.

In the fourth preferred embodiment, the dummy portion generating unit 16 receives from the baseband processing unit 18 copies of the RTP packets received during the call-on-hold state and forwards a portion of these copied RTP packets without header to the packet assembling unit 12, where the new headers generated by the header generating unit 14 are added, to obtain new user plane traffic to be looped back to the UMA network. Again, the header generating unit 14 may generate a header sequence with RTP SN and TS fields incremented with every following header.

The sending of RTP packets with dummy portion could be used also in the beginning of a call, before the actual call is active. This would mean that RTP packet sending may be triggered by an uplink user plane RTP stream generated at the MA 10 or by an URR Active Channel Complete Message received at the MS 10. The actual call starts after receipt of a connect message (e.g. URR DL DIRECT TRANSFER). There can be a big time gap between the above trigger event and the start of the call, due to various facts (e.g. signals can be lost, other end needs to answer the call, etc.).

The transmitting device of FIG. 2 may as well be provided in a network controller device, such as the UNC 30, where continuous transmission to the MS 10 may be required to enable quality measurements in both uplink and downlink direction in states where no user plane traffic is available.

It is pointed out that the present invention is not restricted to UMA networks or other networks using unlicensed frequencies. The solutions explained in connection with the above first to fourth embodiments may as well be implemented in a Generic Access Network (GAN) environment involving a General Access Network Controller (GANC), as defined in the 3GPP specification TS 44.318 V6.2.0, Generic Access (GA) to the A/Gb interface, Mobile GA interface layer 3 specification.

It is thus not limited to unlicensed access or even mobile access. Here, continuous transmission of RTP packets between a MS and the GANC is essential to enable quality measurements in downlink and uplink. If there is no speech sample or other user plane traffic in the RTP packet, i.e., audio path is off or silent, the MS and the GANC can send empty RTP packets with the proposed dummy portion. The GANC may configure itself for transmission of RTP packets to the MS to the indicated UDP port and RTCP packets to the MS, if the information element (IE) 'RTCP UDP Port' is included to the packet header by the MS, and may transmit a GA-CSR ACTIVATE CHANNEL COMPLETE message to the MS.

To enable downlink quality measurements in the MS, the GANC may send at least one RTP packet each predefined period, e.g., 480 ms. If there is no user audio (e.g. Call Setup phase or Call Hold) the GANC shall generate RTP idle packets comprising a dummy portion, as explained in the above first to fourth embodiments.

The RTP channel is available for use by upper layers. To enable uplink quality measurements in the GANC, the MS 10 can send at least one RTP packet each predefined period, e.g., 480 ms. If there is no user audio (e.g. Call Setup phase or Call Hold) the MS generates RTP idle packets comprising a dummy portion, as explained in the above first to fourth embodiments.

The RTP idle packets belongs to the same RTP stream as the audio packets, i.e. SSRC/PT match. In RTP idle packets, the SN is incremented, and in case the RTP idle packet has no payload, the TS will not be incremented. In case the RTP idle packet payload is has e.g. NO_DATA or SID frame(s) then TS shall be incremented according to the IETF specification RFC 3267.

Without definition of the RTP idle packets, any kind of RTP packet would be accepted, which would cause interoperability errors, e.g., in the call setup phase or call hold phase, when audio path is off.

A further example of a state of inactive user plane is a mute state, in which the user may have simply muted the microphone of his terminal device, e.g. mobile phone. In this case, the user still hears the conversation but there is no user traffic to send.

In summary, a method, terminal device and system have been described for providing user plane traffic during a holding state of the terminal device which is connected via an unlicensed mobile access network. A sequence of successive packet headers, adapted to continue a header sequence transmitted until the start of the holding state is generated, and respective dummy portions are added to the sequence of successive packet headers to obtain a stream of data packets. The generated stream of data packets is then transmitted from the terminal device via the unlicensed mobile access network during the holding state. Thereby, user plane traffic can also be provided during the holding state of the terminal device and real-time traffic requirements can be met. In general, dummy packets are sent periodically for measurement purposes in the access network.

The above described functions or units 12, 14 and 16 of the terminal device 10 as shown in FIG. 2 may be implemented as software routines which are configured to run a computer device or processor device provided in the terminal device 10. As an alternative, these units or function as indicated by the blocks of FIG. 2 may be implemented as discrete hardware circuits.

It is to be noted that the present invention is not restricted to the above preferred embodiments but can be implemented in any other network which uses user plane traffic, such as Voice over IP (VOIP) based access networks which do not allow (long) breaks in the user traffic stream. The present invention is thus applicable to any packet transmission which requires continuous user plane traffic even during states of inactive user plane.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
generating a sequence of successive packet headers, adapted to continue a header sequence transmitted until the start of a state of inactive user plane over a radio link to an access network;
adding to the generated header sequences respective dummy portions;
transmitting the stream of data packets via the access network during the state of inactive user plane so as to obtain a continuous stream of user data irrespective of the state of inactive user plane, and
selecting the dummy portions to comprise information indicating that no data is carried in a payload portion of the data packets.

2. The method according to claim 1, wherein the information is a NO_DATA field of an adaptive multi-rate speech coder.

3. The method according to claim 1, further comprising selecting the dummy portions to include no payload.

4. The method according to claim 3, further comprising selecting a time stamp information of the generated successive packet headers to be identical to a time stamp information of the last packet including payload and transmitted before the start of the state of inactive user plane.

5. The method according to claim 1, further comprising selecting the dummy portion to comprise a silence descriptor information.

6. The method according to claim 5, further comprising selecting a transmission interval between packets of the stream of data packets during the state of inactive user plane based on the length of a comfort noise defined by the silence descriptor information.

7. The method according to claim 1, further comprising copying the dummy portion from packets received during the state of inactive user plane, so that received packets are looped back with modified headers.

8. The method according to claim 1, wherein the transmitting configured to transmit data packets of the stream of data packets at a predetermined interval.

9. The method according to claim 1, further comprising incrementing a sequence number of the generated successive packet headers with each successive packet header.

10. The method according to claim 1, wherein the stream of data packets is generated in accordance with a real time protocol.

11. The method according to claim 1, wherein the state of inactive user plane is at least one of a holding state, a call setup state, and a mute state.

12. A computer program product comprising computer code for producing the method of claim 1 when run on a computer device.

13. An apparatus, comprising:
a header generator for generating a sequence of successive packet headers, adapted to continue the header sequence transmitted until the start of the state of inactive user plane over a radio link to an access network;
a dummy portion generator for generating dummy portions of data packets; and
a packet assembler for adding the generated dummy portions to the generated sequence of successive packet headers, so as to obtain a stream of data packets; and
a transmitter for transmitting the stream of data packets during the state of inactive user plane so as to obtain a continuous stream of user data irrespective of the state of inactive user plane, and
selecting the dummy portions to comprise information indicating that no data is carried in a payload portion of the data packets.

14. The apparatus A transmitting device according to claim 13, wherein the dummy portion generator generating unit is configured to generate the dummy portions with a NO_DATA field of an adaptive multi-rate speech coder.

15. The apparatus according to claim 13, wherein the dummy portion generator is configured to generate the dummy portions without any payload.

16. The apparatus according to claim 15, wherein the header generator is configured to select a time stamp information of the generated successive packet headers so as to be identical to a time stamp information of the last packet including payload and transmitted before the start of the state of inactive user plane.

17. The apparatus according to claim 13, wherein the dummy portion generator is configured to generate the dummy portion with a silence descriptor information.

18. The apparatus according to claim 17, wherein the transmitter is configured to set a transmission interval between packets of the stream of data packets during the state of inactive user plane based on the length of a comfort noise defined by the silence descriptor information.

19. The apparatus according to claim 13, wherein the dummy portion generator is configured to copy the dummy portion from packets received at the transmitting device during the state of inactive user plane, so that received packets are looped back with modified headers.

20. The apparatus according to any one of claim 13, wherein the transmitter is configured to transmit data packets of the stream of data packets at a predetermined interval.

21. The apparatus according to any one of claim 13, wherein the header generator is configured to increment a sequence number of the generated successive packet headers with each successive packet header.

22. The apparatus according to any one of claim 13, wherein the packet assembler is configured to generate the stream of data packets in accordance with a real time protocol.

23. The apparatus according to any one of claim 13, wherein the state of inactive user plane is at least one of a holding state, a call setup state, and a mute state.

24. A system for providing communication via an access network, the system comprising a terminal device and a network controller device to which the terminal device is connected, at least one of the terminal device and network controller device comprising the apparatus claim 13.

25. A terminal device for providing communication via an access network, the terminal device comprising the apparatus of claim 13.

26. A network controller device for providing communication via an access network, the network controller device comprising the apparatus of claim 13.

27. An apparatus, comprising:
a header generator for generating a sequence of successive packet headers, adapted to continue the header sequence transmitted until the start of the state of inactive user plane over a radio link to an access network;
a dummy portion generator for generating dummy portions of data packets; and
a packet assembler for adding the generated dummy portions to the generated sequence of successive packet headers, so as to obtain a stream of data packets; and
a transmitter for transmitting the stream of data packets during the state of inactive user plane so as to obtain a continuous stream of user data irrespective of the state of inactive user plane, and
selecting the dummy portions to comprise information indicating that no data is carried in a payload portion of the data packets.

* * * * *